US009990101B2

(12) United States Patent
Commarford et al.

(10) Patent No.: US 9,990,101 B2
(45) Date of Patent: *Jun. 5, 2018

(54) MANAGING GUI CONTROL AUTO-ADVANCING

(71) Applicant: International Business Machines Corporation, Armonk, NY (US)

(72) Inventors: Patrick M. Commarford, Louisville, KY (US); Lauren M. Shupp, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 284 days.

This patent is subject to a terminal disclaimer.

(21) Appl. No.: 15/051,542

(22) Filed: Feb. 23, 2016

(65) Prior Publication Data

US 2016/0170574 A1 Jun. 16, 2016

Related U.S. Application Data

(63) Continuation of application No. 12/187,522, filed on Aug. 7, 2008, now Pat. No. 9,280,286.

(51) Int. Cl.
*G06F 3/0481* (2013.01)
*G06F 3/0489* (2013.01)
(Continued)

(52) U.S. Cl.
CPC ........ *G06F 3/0481* (2013.01); *G06F 3/04842* (2013.01); *G06F 3/04892* (2013.01); *G06F 17/24* (2013.01)

(58) Field of Classification Search
CPC ............... G06F 3/0481; G06F 3/04842; G06F 3/04892; G06F 17/24
See application file for complete search history.

(56) References Cited

U.S. PATENT DOCUMENTS 3,610,902 A * 10/1971 Rahenkamp ........ G06F 3/04892
705/30
3,753,233 A * 8/1973 Cardell, Jr. ......... G06F 3/04892
715/223

(Continued)

OTHER PUBLICATIONS

Chris Campbell; "10 Tips to a Better Form"; Oct. 23, 2005; http://particletree.com/features/10-tips-to-a-better-form; last visited on Sep. 28, 2009.

(Continued)

*Primary Examiner* — Jung-Mu T Chuang
(74) *Attorney, Agent, or Firm* — Steven M. Greenberg, Esq.; CRGO Law

(57) ABSTRACT

Embodiments of the present invention provide a method, system and computer program product for preventing unintentional GUI control advances. In an embodiment of the invention, a method for preventing unintentional graphical user interface (GUI) control advancing associated with an auto-advance feature can be provided. The method can include defining a threshold time period, selecting a GUI control in a GUI for which auto-advancement is enabled, receiving complete input for the selected GUI control, and suppressing a manual directive to advance to a next ordered GUI control in the GUI responsive to the manual directive being received within the threshold time period between the receipt of the complete input and the manual directive.

18 Claims, 2 Drawing Sheets

(51) Int. Cl.
*G06F 3/0484* (2013.01)
*G06F 17/24* (2006.01)

(56) References Cited

U.S. PATENT DOCUMENTS

| | | | | |
|---|---|---|---|---|
| 5,603,053 | A * | 2/1997 | Gough | G06F 3/0481 345/156 |
| 6,252,592 | B1 * | 6/2001 | King | G06F 8/34 715/764 |
| 7,440,945 | B2 * | 10/2008 | Dettinger | G06F 17/30607 |
| 7,500,201 | B2 * | 3/2009 | Treibach-Heck | G06F 3/0482 715/224 |
| 7,913,184 | B1 * | 3/2011 | Zhang | G06F 17/243 715/224 |
| 7,958,449 | B2 * | 6/2011 | Chen | G06F 17/30905 715/709 |
| 9,727,549 | B2 * | 8/2017 | Chirca | G06F 17/243 |
| 2005/0005234 | A1 * | 1/2005 | Chen | G06F 17/243 715/221 |
| 2006/0026438 | A1 * | 2/2006 | Stern | H04L 51/12 713/184 |
| 2009/0187842 | A1 * | 7/2009 | Collins | G06F 3/0482 715/769 |
| 2014/0365931 | A1 * | 12/2014 | Yoshimura | G06F 3/04842 715/767 |
| 2017/0199627 | A1 * | 7/2017 | Ikeda | G06F 3/0481 |

OTHER PUBLICATIONS

Chris Campbell; "10 Tips to a Better Form"; Oct. 23, 2005; http://web.archive.org/web/20051027011630/http://particletree.com/features/10-tips-to-a-better-form; last visited on Sep. 28, 2009.
Matthew Miller; "Autotab: jQuery Auto-Tabbing and Filter Plugin"; http://www.lousyllama.com/sandbox/jquery-autotab; last visited on Sep. 30, 2009.

* cited by examiner

MANAGING GUI CONTROL AUTO-ADVANCING

CROSS-REFERENCE TO RELATED APPLICATIONS

This application is a Continuation of U.S. patent application Ser. No. 12/187,522, filed on Aug. 7, 2008, now allowed, which is incorporated herein by reference in its entirety.

BACKGROUND OF THE INVENTION

Field of the Invention

The present invention relates to the field of graphical user interface (GUI) controls and more particularly to control advances from field to field in a GUI.

Description of the Related Art

A graphical application provides a GUI in order to manage content viewed by an end user on a display screen. A GUI control is a user interface element with which end users interact. Events resulting from user input provided in connection with a GUI control, such as a mouse click or keyboard stroke, are detected by the client application and handled using one or more "listener" processes in the application. A form is a type of GUI for an application through which data is collected for processing in the application. As such, a GUI form acts as a container for a number of GUI controls—especially text boxes, radio buttons, drop-down lists, check boxes and the like. End users generally "complete" a form by providing input to the controls of the GUI such as entering text in a text box, and subsequently submitting the form to an agent for processing (e.g., to a Web server, to a mail server, etc.).

Despite a degree of organization provided by an arrangement of controls in GUI form, some controls permit free-form entry of data and, in consequence, provide enough latitude to the end user to provide requested information in a format not readily understood by the underlying application. As such, best practices management from GUI form design specifies the decomposition of input fields into smaller units of input to avoid free form entry of data. A classic example would be the decomposition of address input into respective street, city, state and zip code input fields. Providing granular input fields in a GUI form, however, results in the complication of the GUI form in particular in respect to the number of fields through which the end user must advance.

Ordinarily, an end user navigates a GUI form by selecting a next field with a mouse click, or keyboard stroke such as a tab stroke or carriage return stroke. To help the end user navigate more quickly through longer GUI forms, many applications automatically advance the cursor position of the end user from one field to the next once the a maximum number of characters have been input for a particular input field. This type of auto-advancing is especially helpful when the data field can be parsed or formatted in a structured form, such as a user's social security number or telephone number.

Not all GUI forms provide for auto-advancing. Thus, the end user is left to guess as to whether or not manual form field navigation is required. When auto-advancing unexpectedly is available for a GUI form, out of habit the end user oftentimes engages a manual form field advance resulting in the end user navigating beyond a desired GUI form field.

BRIEF SUMMARY OF THE INVENTION

Embodiments of the present invention provide a method, system and computer program product for preventing unintentional GUI control advances. In an embodiment of the invention, a method for preventing unintentional graphical user interface (GUI) control advancing associated with an auto-advance feature can be provided. The method can include defining a threshold time period, selecting a GUI control in a GUI for which auto-advancement is enabled, receiving complete input for the selected GUI control, and suppressing a manual directive to advance to a next ordered GUI control in the GUI responsive to the manual directive being received within the threshold time period between the receipt of the complete input and the manual directive.

In another embodiment of the invention defining a threshold time period ca include initializing a timer, wherein the timer measures the time between the receipt of the complete input and the manual directive. In yet another embodiment of the invention, selecting a GUI control in a GUI can include selecting a pre-formatted text box in a GUI form. In yet another embodiment, receiving complete input can include receiving input of a set number of characters expected by the selected GUI control. Furthermore in another embodiment of the invention suppressing a manual directive can include ignoring user input being received by the next ordered GUI control.

In yet another embodiment of the invention, receiving complete input for the selected GUI control further can include automatically forwarding of a cursor from the selected GUI control to the next ordered GUI control responsive to receiving a set number of characters in the selected GUI control. In another embodiment, the manual directive to advance can be a delimiter input selected from the group consisting of tab, space, period, dash, and carriage return stroke.

In yet another embodiment of the invention, a data processing system configured to prevent unintentional GUI control advancing associated with an auto-advance feature can be provided. The data processing system can include a computing application executing in a computing system, a GUI produced by the computing application and comprising a plurality of ordered GUI controls and configured for auto-advancement from a completed one of the GUI controls to a next ordered one of the GUI controls, and GUI control auto-advancing management logic coupled to the GUI, the logic comprising program code enabled to receive complete input for a selected one of the ordered GUI controls, and to suppress a manual directive to advance to a next ordered one of the GUI controls in the GUI form responsive to the manual directive being received within a threshold time period between a receipt of complete input for the selected one of the GUI controls and the manual directive.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for managing GUI control auto-advancing. In accordance with an embodiment of the present invention, a threshold time period of time can be defined and a control in a GUI can be selected and completed with input expected by the selected control. Thereafter, when auto-advancing for controls in the GUI has been enabled, manual advancing from the selected control to a next ordered control in the GUI can be suppressed in response to a manual directive to advance to the next ordered control received within the threshold period of time between the completion of the input in the selected control and the manual directive to advance to the next ordered control.

Figure 1:
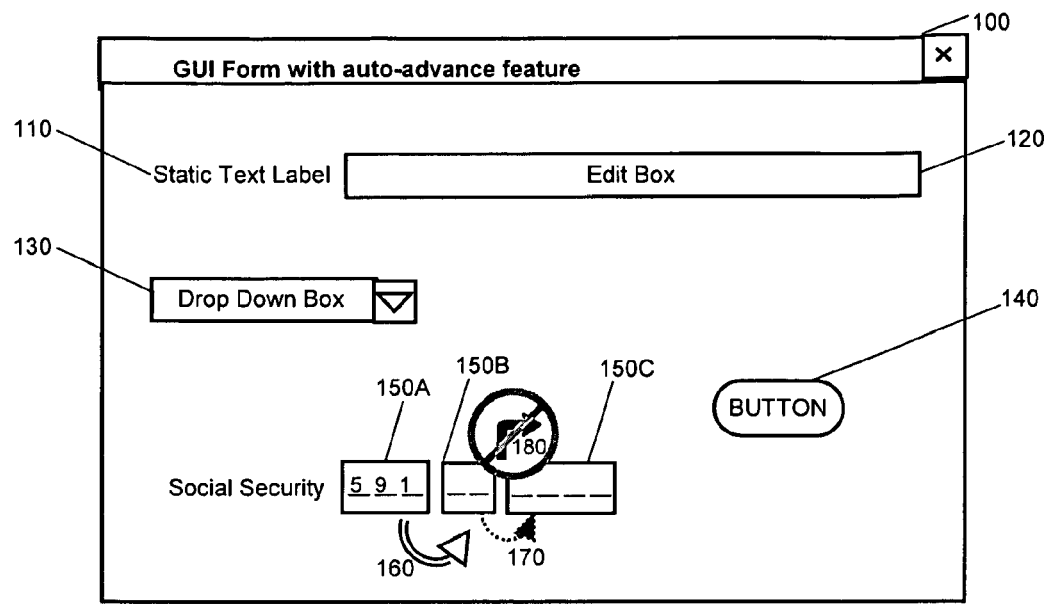
FIG. 1 is a pictorial illustration of a GUI configured to manage GUI control auto-advancing.

In further illustration, FIG. 1 is a pictorial illustration of a GUI form configured to manage GUI control auto-advancing. A GUI form 100 can include interactive and non-interactive controls. Non-interactive controls can include static text fields 110, while interactive controls can include an edit box 120, a drop-down box 130, a button 140, and a pre-formatted text boxes/data fields 150A, 150B, 150C. An auto-advance feature 160 can be enabled for the GUI form 100 such that an automatic forward focus from a first pre-formatted text box to a second pre-formatted text box can occur subsequent to a user inputting the maximum required character limit in the first pre-formatted text box/data field.

For example, a valid format for a social security number is nine digits with a delimiter—a dash—after the third and fifth digits. Once a user enters the first 3 digits "591" in the first pre-formatted data field 150A, the pointer is automatically advanced to the second pre-formatted data field 150B. Ideally, the user should continue inputting his/her SSN by inputting the 4$^{th}$ and 5$^{th}$ digits of his/her SSN in the second pre-formatted data field 150B. The problem arises however when a user, not being aware that the auto-advance feature 160 has already moved the cursor to the next data field 150B, ends up immediately pressing the Tab key 170 subsequent to the auto-advancement 160 into the second data field 150B. Consequently, the user would unintentionally be "double advancing" into the third data field 150C under a GUI with a conventional auto-advance feature. Unlike conventional auto-advance features though, here the user's tab key press can be ignored as an unintentional field advance 180 if the tab key was pressed within a very short time frame (for example 300-350 ms) subsequent to the auto-advancement.

Figure 2:
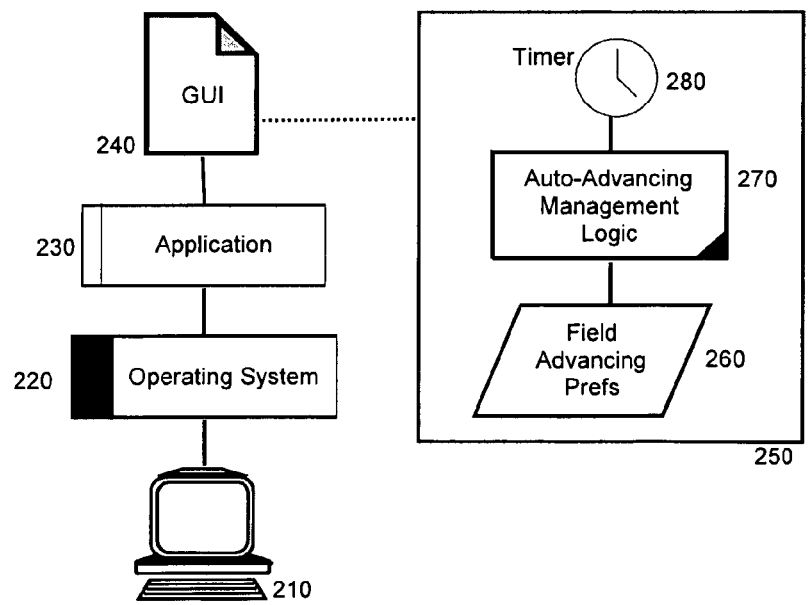
FIG. 2 is a schematic illustration of a data processing system configured to manage GUI control auto-advancing.

In further illustration, FIG. 2 schematically depicts a data processing system configured to manage GUI control advancing. The data processing system can include a host computing platform 210 including an operating system 220. The operating system 220 can support the execution of an application 230 providing a GUI 240. Notably, the GUI 240 can be coupled to a resource defining a user interface control featuring intelligent auto-advancing options 250. Implementations of the user interface control featuring intelligent auto-advancing options 250 can be rendered within the GUI 240 for the application 230.

The user interface control featuring intelligent auto-advancing options 250 can be managed by GUI control auto-advancing management logic 270 in concert with timer 280. The logic 270 in turn can be coupled to GUI control advancing preferences 260. The GUI control advancing preferences 260 can include policies associated with each user interface control such as threshold time periods for defining when a user's input is unintentional. In operation, the logic 270 can manage a manual directive to advance from one selected control in the GUI 240 to a next ordered control in the GUI 240 when auto-advancing has been enabled for the GUI 240. By way of example, an unintentional GUI control advance can be avoided through the operation of the logic 270 when the user strikes the tab key within a threshold period of time measured by the timer 280 from the completion of the selected control and the user striking the tab key.

As a further example, a pseudo-code implementation of the logic 270 is set forth as follows:

```
onKeyEvent( ) {
    if ((stringLength == maxStringLength) or (keyPressed ==
    validDelimiters))
    then advance( );}
advance( ){
    advance to next field ;
    ignore (TAB key and anyValidDelimiter key ) for 350 ms;}
```

In the pseudo-code shown above, the 'advance' function can serve as a method for managing GUI control auto-advancing. By ignoring any tab key press or any valid delimiter key occurring subsequent to an auto-advancement, the correct position of the field requiring data input can be preserved. The 'onKeyEvent' function determines whether a data field of a pre-formatted text box requiring a maximum pre-defined number of characters (maxStringLength) has been reached. For instance, if a user inputs a social security number into the first data field of the pre-formatted SSN text box (which has 3 data fields), then once the user enters the first 3 digits in the first data field, the stringLength will equal the maxStringLength. Thereafter, the pointer/focus is automatically advanced to the next data field of the pre-formatted text box so that the user can continue to complete his/her social security number.

Figure 3:
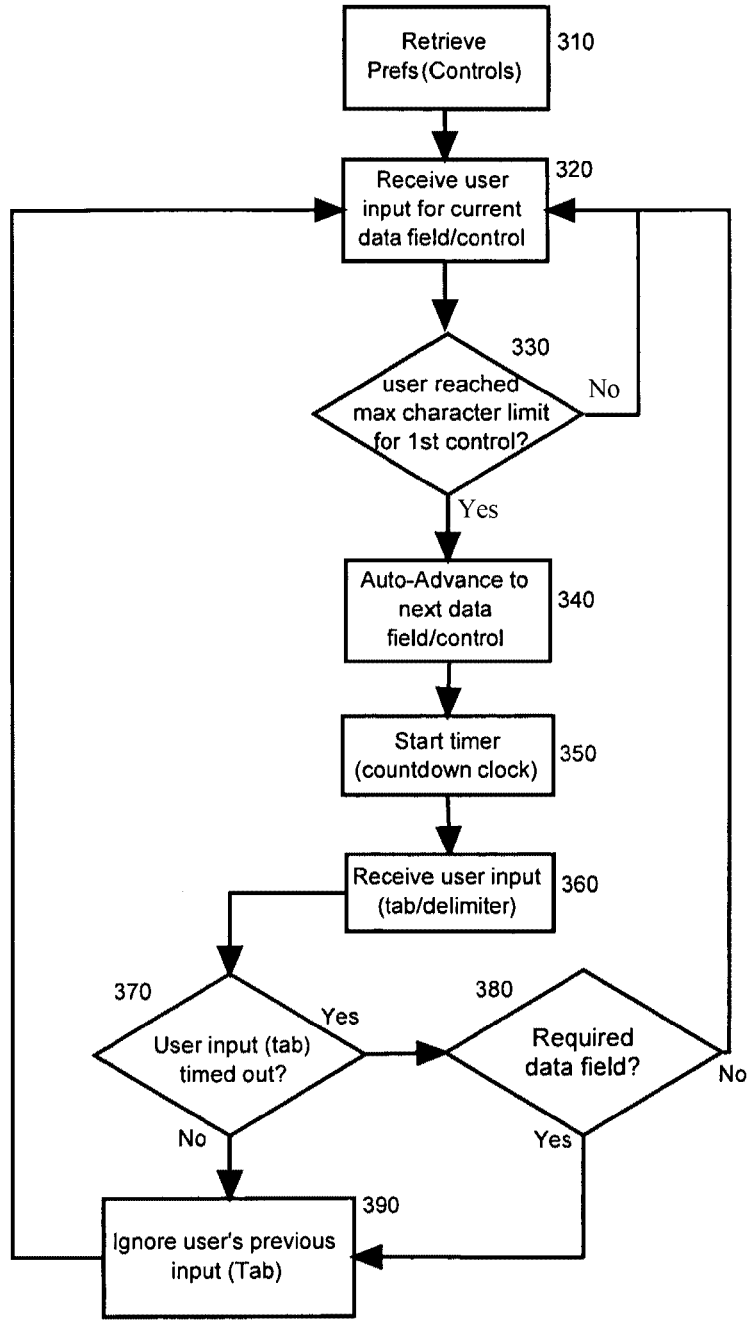
FIG. 3 is a flow chart illustrating a process for managing GUI control auto-advancing.

In yet further illustration, FIG. 3 is a flow chart showing a process for managing GUI control auto-advancing. Initially, in block 310, preferences regarding all controls of a GUI form can be retrieved. The preferences can include policies associated with each user interface control such as threshold time periods for defining when a user's input is unintentional. Additionally, the preferences can include enabling auto-advancing for the GUI. Next in block 320, user input for a current control can be received. In order to implement an intelligent auto-advance, it can be determined if the current control is a pre-formatted data field. In order to determine if the current control is a pre-formatted data field, in decision block 330, it can be determined whether the user input has reached the maximum amount of characters for the 1$^{st}$ control/data field. If no, then the 1$^{st}$ data field can continue to accept user input in block 320 until the maximum number of characters is reached.

Auto-advancement can occur immediately after the maximum number of characters has been entered by the user or a predefined delimiter has been entered, for instance a period or tab key. When the maximum number of characters is reached in a data field, the current position/cursor can be automatically advanced to the next data field in block 340. Next in block 350, as soon as an auto-advanced has occurred, a countdown clock/timer can be initiated to define a threshold time period for ignoring any subsequent user tab key press (or any valid delimiter). For instance, if the clock/timer countdown is set to 350 ms, any user input received as a tab key press (or any valid delimiter) can be ignored up to 350 ms as an unintentional field advance.

In order to determine whether a user input is unintentional, in decision block 370 if the user input—the Tab key press—was within the countdown threshold period, i.e. not timed out by the countdown clock/timer, then in block 390 the user's previous input—the tab key press—can be ignored as an unintentional GUI control advance. Thus, after an auto-advancement, any tab key press (or any valid delimiter) can be ignored if it occurred within the specified threshold time period set by the countdown clock/timer. Alternatively, in decision block 370, if the user's input—the tab key press—was made after the countdown threshold period, i.e. timed out, and in decision block 380 the data field is determined to be a required data field necessitating user input, then the user's input can still be ignored. For instance, if a user has initiated to fill out his/her social security number as a required input by the GUI form, then even if the user tries to tab away or partially fills it out and then tries to tab away, the system is able to prevent the user from purposefully skipping a required data field.

Alternatively, if a field is a required field, instead of ignoring user input even if it's outside the timer threshold, an exemplary embodiment can include setting different thresholds based on whether the "advanced to" field is required. For example, setting a longer threshold for which input will be ignored when the field is required can be implemented.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for preventing unintentional graphical user interface (GUI) control advancing associated with an auto-advance feature comprising:
    retrieving policies associated with each GUI control in a set of GUI controls in a GUI executing in a memory of a computer, the policies specifying threshold time periods defining when input from a user is unintentional;
    receiving a first complete input from a user for a selected GUI control;
    auto-advancing, by a hardware processor of the computer for which auto-advancement is enabled, to a next ordered GUI control upon receiving the first complete input for the selected GUI control;
    determining a threshold time period from a policy associated with the next ordered GUI control;
    counting down, by the hardware processor of the computer, from the determined threshold time period upon auto-advancing to the next ordered GUI control;
    suppressing, by the hardware processor of the computer, a manual directive to advance to a subsequent and different next ordered GUI control in the GUI during the count down, but permitting the manual directive to advance to the subsequent and different next ordered GUI control subsequent to the count down unless a determination is made that a data field for the next ordered GUI control is required and a second complete input is not received for the data field of the next ordered GUI control, and upon determining that the data field for the next ordered GUI control is required and a second complete input is not received for the data field of the next ordered GUI control, suppressing the manual directive to advance to the subsequent and different next ordered GUI control in the GUI despite the manual directive being received subsequent to the count down; and,
    setting a different and longer threshold time period when a determination is made that any data field is required.

2. The method of claim 1, wherein receiving the first complete input from the user for the selected GUI control comprises receiving input of a set number of characters expected by the selected GUI control.

3. The method of claim 1, wherein suppressing the manual directive comprises ignoring user input being received by the subsequent and different next ordered GUI control.

4. The method of claim 1, wherein auto-advancing to the next ordered GUI control upon receiving the first complete input for the selected GUI control comprises automatically forwarding of a cursor from the selected GUI control to the next ordered GUI control.

5. The method of claim 1, wherein the manual directive to advance to the subsequent and different next ordered GUI control in the GUI is a delimiter input.

6. The method of claim 5, wherein the delimiter input includes one of a tab, a space, a period, a dash, and a carriage return stroke.

7. A computer program product comprising a non-transitory computer usable storage medium embodying computer usable program code for preventing unintentional graphical user interface (GUI) control advancing associated with an auto-advance feature, the computer program code, when executed by a computer, causes the computer to perform:
retrieving policies associated with each GUI control in a set of GUI controls in a GUI executing in a memory of a computer for which auto-advancement is enabled, the policies specifying threshold time periods defining when input from a user is unintentional;
receiving a first complete input from a user for a selected GUI control;
auto-advancing to a next ordered GUI control upon receiving the first complete input for the selected GUI control;
determining a threshold time period from a policy associated with the next ordered GUI control;
counting down from the determined threshold time period upon auto-advancing to the next ordered GUI control;
suppressing a manual directive to advance to a subsequent and different next ordered GUI control in the GUI during the count down, but permitting the manual directive to advance to the subsequent and different next ordered GUI control subsequent to the count down unless a determination is made that a data field for the next ordered GUI control is required and a second complete input is not received for the data field of the next ordered GUI control, and upon determining that the data field for the next ordered GUI control is required and a second complete input is not received for the data field of the next ordered GUI control, suppressing the manual directive to advance to the subsequent and different next ordered GUI control in the GUI despite the manual directive being received subsequent to the count down; and,
setting a different and longer threshold time period when a determination is made that any data field is required.

8. The computer program product of claim 6, wherein receiving the first complete input from the user for the selected GUI control comprises receiving input of a set number of characters expected by the selected GUI control.

9. The computer program product of claim 6, wherein suppressing the manual directive comprises ignoring user input being received by the subsequent and different next ordered GUI control.

10. The computer program product of claim 6, wherein auto-advancing to the next ordered GUI control upon receiving the first complete input for the selected GUI control comprises automatically forwarding of a cursor from the selected GUI control to the next ordered GUI control.

11. The computer program product of claim 6, wherein the manual directive to advance to the subsequent and different next ordered GUI control in the GUI is a delimiter input.

12. The computer program product of claim 10, wherein the delimiter input includes one of a tab, a space, a period, a dash, and a carriage return stroke.

13. A data processing system to prevent unintentional GUI control advancing associated with an auto-advance feature comprising:
a hardware processor of a computer for which auto-advancement is enabled;
a computing application executed by the hardware processor;
a GUI produced by the computing application and comprising a plurality of ordered GUI controls for auto-advancement from a completed one of the GUI controls to a next ordered one of the GUI controls; and,
GUI control auto-advancing management logic coupled to the GUI, the GUI control auto-advancing management logic comprising program code enabled to
retrieve policies associated with each GUI control in a set of GUI controls in a GUI executing in a memory of a computer, the policies specifying threshold time periods defining when input from a user is unintentional,
receive a first complete input from a user for a selected GUI control,
auto-advance to a next ordered GUI control upon receiving the first complete input for the selected GUI control,
determine a threshold time period from a policy associated with the next ordered GUI control,
count down from the determined threshold time period upon auto-advancing to the next ordered GUI control,
suppress a manual directive to advance to a subsequent and different next ordered GUI control in the GUI during the count down, but permitting the manual directive to advance to the subsequent and different next ordered GUI control subsequent to the count down unless a determination is made that a data field for the next ordered GUI control is required and a second complete input is not received for the data field of the next ordered GUI control, and upon determining that the data field for the next ordered GUI control is required and a second complete input is not received for the data field of the next ordered GUI control, suppressing the manual directive to advance to the subsequent and different next ordered GUI control in the GUI despite the manual directive being received subsequent to the count down, and
set a different and longer threshold time period when a determination is made that any data field is required.

14. The data processing system of claim 13, wherein the program code enabled to receive the first complete input from the user for the selected GUI control comprises program code enabled to receive input of a set number of characters expected by the selected GUI control.

15. The data processing system of claim 13, wherein the program code enabled to suppress the manual directive comprises program code enabled to ignore user input being received by the subsequent and different next ordered GUI control.

16. The data processing system of claim 13, wherein the program code enabled to auto-advance to the next ordered GUI control upon receiving the first complete input for the selected GUI control comprises program code enabled to automatically forward a cursor from the selected GUI control to the next ordered GUI control.

17. The data processing system of claim 13, wherein the manual directive to advance to the subsequent and different next ordered GUI control in the GUI is a delimiter input.

18. The data processing system of claim 17, wherein the delimiter input includes one of a tab, a space, a period, a dash, and a carriage return stroke.

* * * * *